United States Patent [19]
Burch

[11] 4,007,657
[45] Feb. 15, 1977

[54] SAW TABLES
[76] Inventor: Andrew E. Burch, 199 Ohio St. NW., Warren, Ohio 44485
[22] Filed: Dec. 5, 1975
[21] Appl. No.: 638,190
[52] U.S. Cl. .............................. 83/471.3; 83/477.1; 83/486.1
[51] Int. Cl.² ......................................... B27B 5/20
[58] Field of Search ........... 83/471.2, 471.3, 486.1, 83/477.1

[56] References Cited
UNITED STATES PATENTS

| | | | |
|---|---|---|---|
| 2,630,146 | 3/1953 | Van Tuyl | 83/471.3 X |
| 3,331,406 | 7/1967 | Christophel | 83/471.3 |
| 3,727,502 | 4/1973 | Steinman | 83/471.3 |

Primary Examiner—Willie G. Abercrombie
Attorney, Agent, or Firm—Michael Williams

[57] ABSTRACT

An improved saw table, comprising a flat base, a pair of guides secured to the base and disposed in parallel relation above the upper surface of the base, the guides providing ways for guiding movement of a saw-support plate. The support plate may be moved along the guideways to perform crosscut operations, or may be shifted at right angles in a planar fashion to dispose the saw for ripping operations. Angle guides are provided and may be set to position a board at right angles to movement of the same, or to any desired angle with respect to such movement. Clamp means are provided to prevent separation of the saw-support plate from the guideways.

10 Claims, 6 Drawing Figures

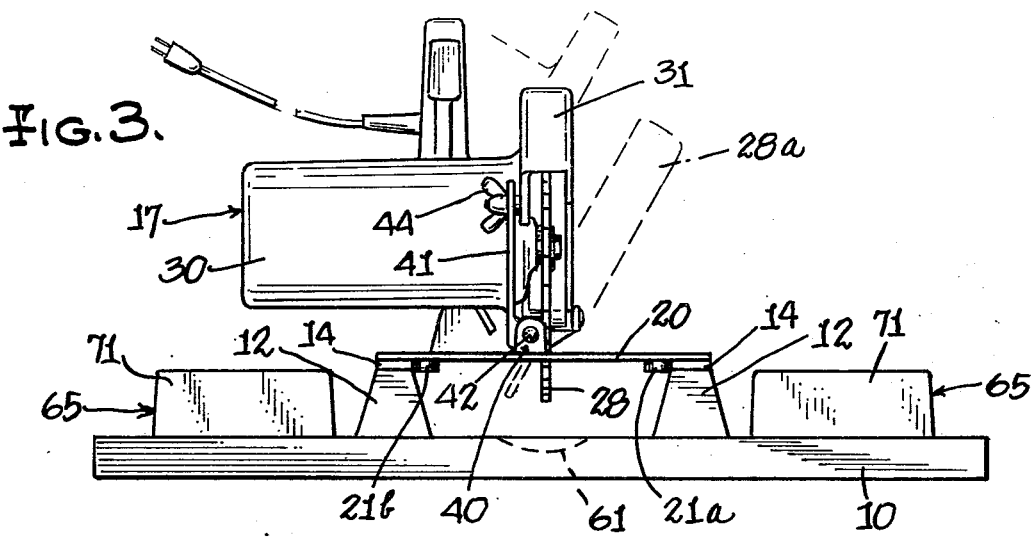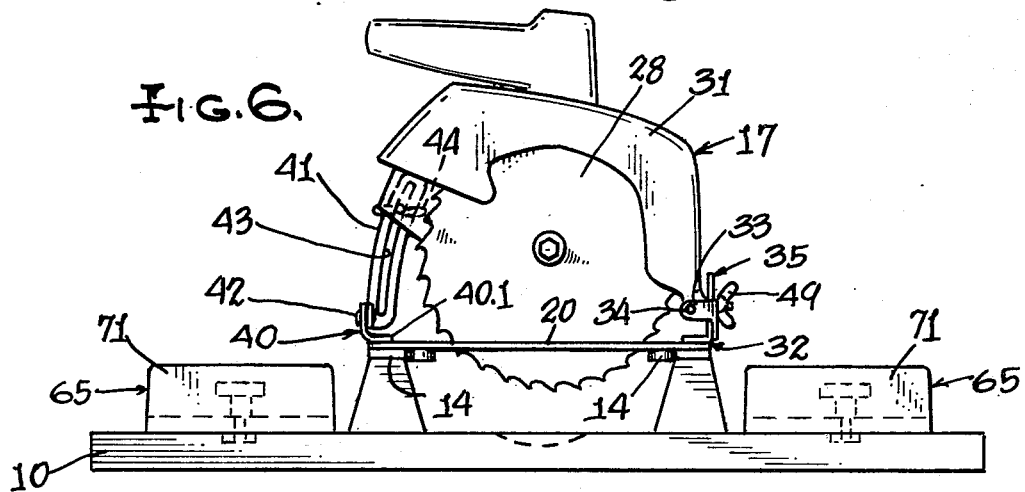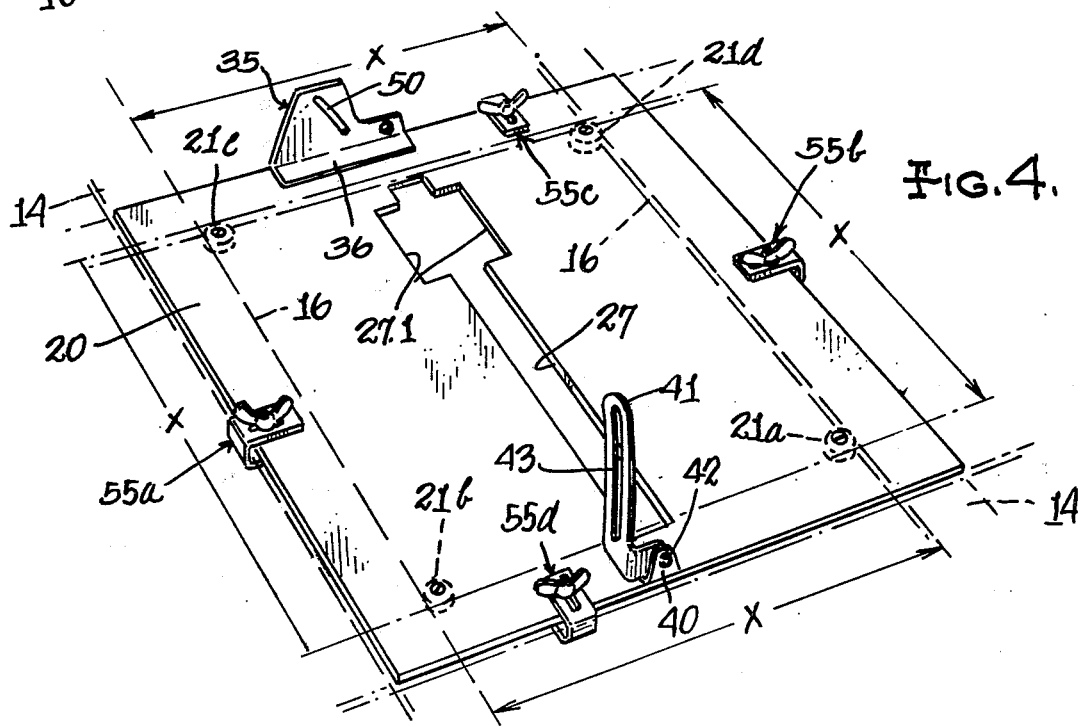

ND SUMMARY

My improved saw table is constructed and arranged to support portable power saws of most commercially available constructions. The prior art discloses many constructions for this purpose but all are of complicated constructions and therefore have, insofar as I am aware, had limited commercial success.

The saw table of my invention is formed of relatively few parts which require little or no maintenance. The table comprises a flat base which is easily transported from job-to-job and may be supported on conventional saw horses or any other suitable support, or may have legs attached thereto which may be either permanently or removably affixed to the base.

Two inexpensive metal bars are secured to the base and extend upwardly therefrom in parallel relation. A saw support plate has fore and aft pivot brackets to secure a conventional power hand saw, the pivot brackets not only holding the saw to the support plate but also providing for tilting of the saw so that boards may be cut at an angle.

The saw support plate has four downward projections which are arranged in a square pattern so that the support plate may be arranged on the metal bars for movement longitudinally thereof, wherein the saw may be disposed for crosscut operations, or may be shifted ninety degrees in planar fashion so that the plate supports the saw for ripping operations.

DESCRIPTION OF THE DRAWINGS

In the drawings accompanying this specification and forming a part of this application, there is shown, for purpose of illustration, an embodiment which my invention may assume, and in these drawings:

FIG. 3 is an end view thereof, FIG. 4 is a prespective view of the saw-support plate, FIG. 6 is an end elevational view similar to FIG. 3, but showing the saw-support plate, and the saw carried thereby, in position for ripping operations.

DESCRIPTION OF THE PREFERRED EMBODIMENT

Figure 1:
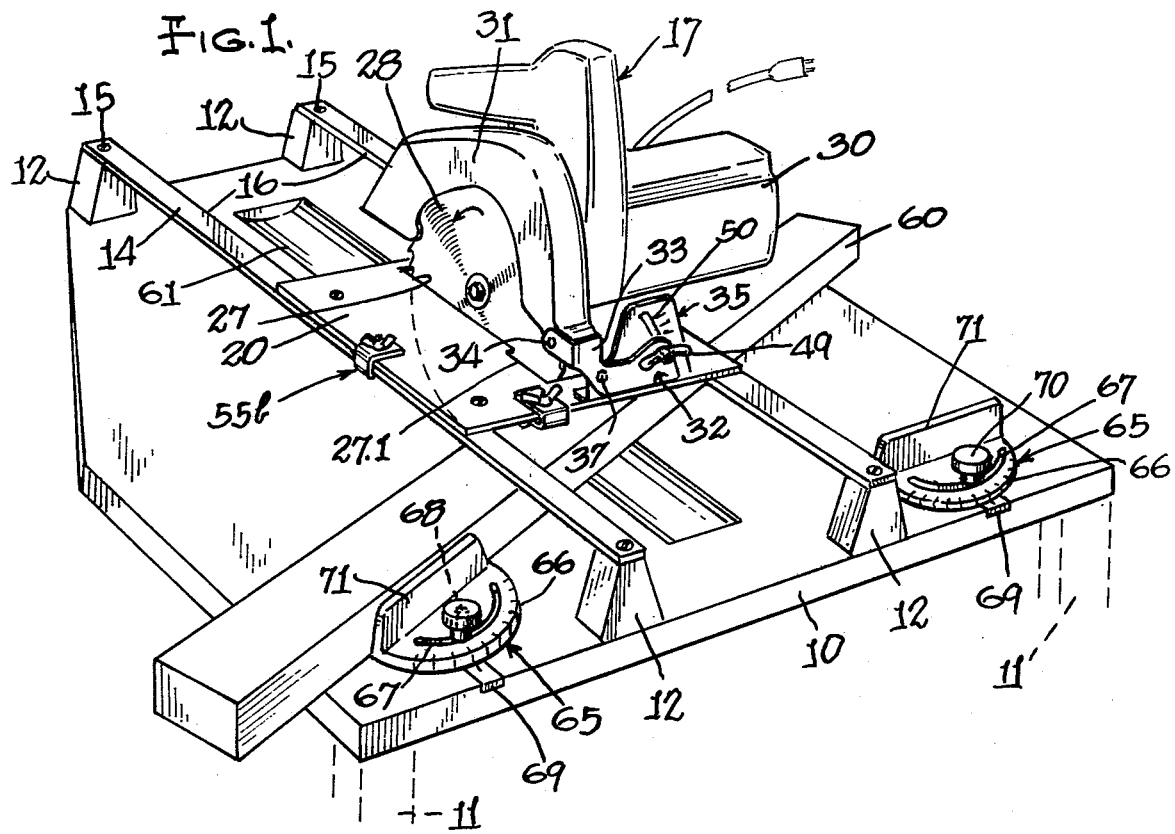
FIG. 1 is a perspective view of a presently preferred embodiment of my invention, showing a portable power saw supported for crosscut operations.

As best seen in FIG. 1, the preferred embodiment of my invention comprises a flat base 10 which may take any desired configuration in plan view, as long as it adequately supports the structure to be described. The base 10 should have considerable rigidity, and may be formed of a relatively thick slab of wood, or may be a metal plate. The base 10 is adapted to be supported on saw horses or the like and may be carried from job-to-job, or it may be provided with legs 11 (shown in dotted lines in FIG. 1) and be supported from a floor surface.

Four pedestals 12 of any suitable rigid material, such as wood or steel, are secured to the top surface of the base and extend upwardly therefrom to a plane which is parallel to the plane of the upper surface of the base. Two steel bars 14—14 are secured to respective pairs of pedestals 12, as seen in FIG. 1, and the connection may be effected by means of screws 15 which pass through holes in the bars 14 and are threaded into respective pedestals. The bars are held so that their inner edge margins 16 are parallel, and these margins are spaced a suitable distance, such as seven inches in the disclosed embodiment.

Figure 5:
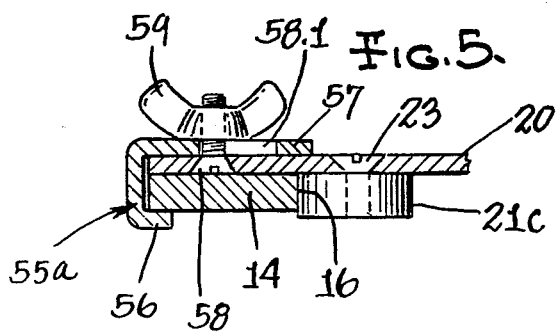
FIG. 5 is an enlarged fragmentary view of a holddown bracket.

A portable, electric power saw 17 of any commercially available design may be used with my invention, and such saw is carried by a support plate 20 which is preferably square in plane and formed of metal. The plate has depending guide means which are engageable with the bars 14—14 to properly position the saw 17. As seen in FIGS. 4 and 5, the guide means comprises a plurality of round members 21a, 21b, 21c and 21d, each of which is secured by a screw 23 to the support plate 20 to extend downwardly from the lower surface thereof. The members 21 are disposed in a square pattern on the support plate so that the dimensions "X" between any adjoining pair are equal and, in the illustrated embodiment are just slightly less than 7 inches so as to closely, but slidably fit between the inner margins 16 of the bars 14—14.

The members may be in roller form so as to have rolling engagement with the bar margins 16, but in the illustrated embodiment they are held against rotation by the screws 23 in slightly offcenter relation so that by loosening a screw and slightly rotating a member, each may be adjusted to have proper sliding fit with the bar margins 16.

The saw support plate is formed with an elongated slot 27 to pass the circular saw blade 28, and the slot has side openings 27.1 so that an operator may clearly see engagement of the saw with the board being cut, and thus may follow a line marked on the board. In accordance with conventional construction, the blade is rotatably carried within a metal housing having a motor portion 30 in which the usual electric motor (not shown) is disposed. The housing includes a somewhat semi-circular shroud 31 to cover and protect that part of the saw blade 28 which extends above the support plate 20.

A first bracket 32 has ears 33 which are pivoted by a pin 34 to one end of the shroud 31. The bracket has a flat portion which is in juxtaposition with the flat portion of a second bracket 35 and the latter has a foot 36 which is fixed to the upper surface of the support plate 20. A pivot pin 37 joins the flat portions of the brackets 32 and 35, this pin being at right angles to the pivot 34. The opposite end of the shroud is swingable in a vertical direction about the pivot pin 34 in order to move the saw 28 toward or away from the work. This end of the shroud has an adjustable connection with the support plate 20 and in the disclosed embodiment, an ear 40 has a foot 40.1 which is fixed to the upper surface of the plate. An upright, curved bracket 41 has its lower end pivoted by a pin 42 to the ear 40, the bracket having a curved slot 43, the curvature having as its center the axis of the pivot pin 34. A wing bolt 44 passes through the slot 43 and is threaded into a side portion of the shroud. Thus, the free end of the shroud may be swung about the pivot pin 34, or may be held in desired position (such as its upper position shown in FIG. 2) to provide clearance for positioning work under the saw. The shroud is held in position by tightening the wing bolt so that the head of the later clamps the shroud to the bracket 41. With the wing bolt loose, the saw may be moved downwardly into cutting relation with the work.

The pivot pins 37 and 42 are axially aligned so that the shroud and motor housing may be swung thereabout to tilt the saw at an angle to the vertical, such as shown in dotted lines 28a in FIG. 3. The housing and saw may be held in any selected tilted position by a wing nut and bolt arrangement 49, the bolt shank passing through an arcuate slot 50 in the bracket 35 and a hole in the bracket 32, and the wing nut threaded upon the shank and bearing against the outer surface of the flat portion of the bracket 32. The slot 50 has its center of curvature at the pivot pin 37 so that with the wing nut loosened, the housing and shroud may be swung about the pivot pins 34 and 42 to a tilted position (such as shown at 28a in FIG. 3) and then held in position by tightening of the wing nut.

In view of the fact that the saw 28, when it is rotating in the direction of the arrow seen in FIG. 1 and when it engages the work, exerts an upward thrust on the support plate 20, it is preferable to prevent separation of the support plate from the rail bars 14—14. In the presently disclosed embodiment, this is accomplished by clamp members 55a, 55b, 55c, and 55d (see especially FIGS. 1, 4 and 5) each of which has a leg portion 56 engaging under a rail bar 14, and a leg portion 57 engaging over the support plate 20. A screw 58 has its head fastened to the support plate so that its shank passes upwardly through a slot 58.1 and is engaged by a wing nut 59. The slot 58.1 provides for adjustment and easy assembly of the clamp members 55a-55d. As seen in FIG. 4, a clamp member is provided at each side of the support plate 20, for a purpose to appear.

In FIG. 1, a piece of board 60, such as a two by four, is disposed for crosscut by the saw 28. It will be noted that the upper surface of the base 10 has a shallow recess 61 which extends parallel to the guide bars 14 and is positioned so that the saw may cut completely through the board 60 without cutting into the upper surface of the base. The recess is curved in cross-section for a purpose to appear.

Work positioning means are mounted on the base 10 for disposing the board 60 in a desired angular relation with the saw 28 and, in the embodiment disclosed, two similar positioners 65 are provided, one at each side of guide rails 14. Each positioner comprises a base part 66 adapted to overlie the upper surface of the base 10 at one end thereof. The base part has an arcuate slot 67 therein to pass the upper threaded end of a rod 68, the lower end of which is anchored in a metal insert 69 held within a recess in the base. A thumb nut 70 threads onto the upper end of the rod and is adapted to clamp the base part 66 against the base 10 in any angularly adjusted position. The base part may have indicia thereon to align with a reference mark on the insert 69 to visually indicate a selected angle. Each work positioner 65 has an upstanding plane surface 71 against which the board 60 may be abutted.

Figure 2:
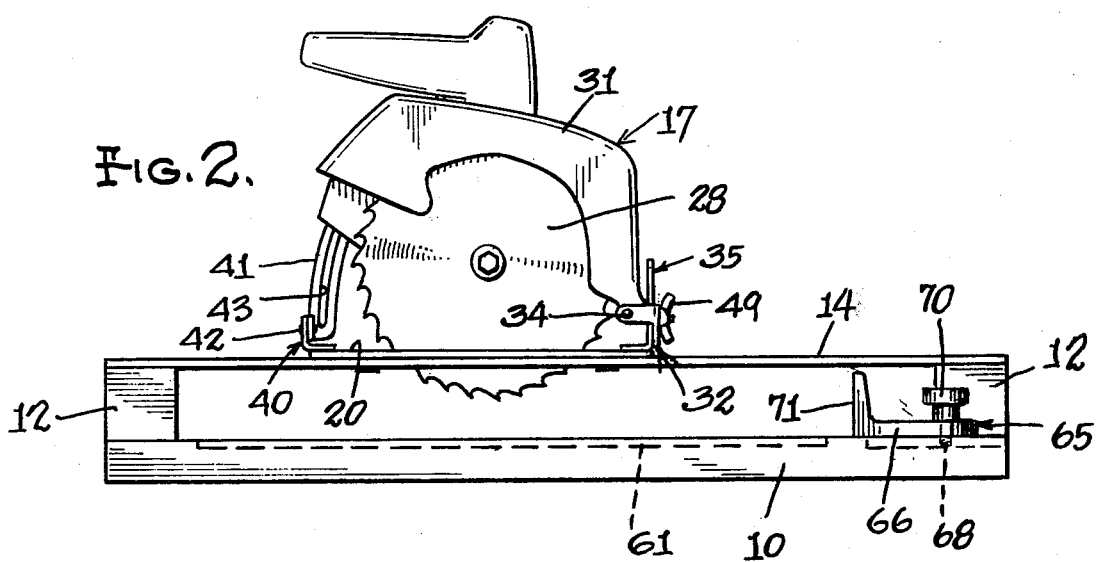
FIG. 2 is a side elevation of the construction shown in FIG. 1.

As suggested in FIG. 1, two clamp members 55a and 55b on opposed sides of the saw support plate 20 are engaged with the rail bars 14 to prevent upward movement of the support plate. In FIGS. 1, 2, and 3, the saw is disposed for crosscut sawing, in which case the round guide members 21a and 21d are in engagement with the inner edge of one guide bar 14, and the round guide members 21b and 21c are in engagement with the inner edge of the other guide bar, the bars in this position being shown in dotted lines in FIG. 4.

The saw may easily be adapted for ripping operations and, to accomplish this, the wing nuts 59 of the two clamp members 55a and 55b engaged in the FIG. 1 illustration (only one visible), are loosened to permit retraction of the clamp members an amount sufficient to clear the lower leg 56 of each from engagement with the rail bars 14. The support plate 20 and saw housing are then lifted as a unit to clear the round guide members 21 from engagement with the rail bars 14. The support plate is then turned ninety degrees in planar fashion and lowered so that the round guide members 21a and 21b engage the inner edge of one guide bar 14 and the guide members 21c and 21d engage the inner edge of the other guide bar 14. The saw is now disposed in the position shown in FIG. 6, with the saw at right angles to the guide bars 14. The clamp members 55c and 55d of the support plate are engaged on the rails and their wing nuts are tightened. It will be noted that these clamp members 55c and 55d (as seen in FIG. 4) are out of alignment, but this is only for clearance of parts of the saw housing and supporting pivotal structure. With one or the other of the positioners 65 properly adjusted, a board may have one edge abutted against the guide portion 71 of a positioner and moved relative thereto and with respect to the saw housing which is not stationary. The circular bottom of the recess 61 will clear the saw 28 so that the upper surface of the base 20 is not marred.

I claim:
1. A saw table for use with a portable power saw of conventional construction, said saw having a motor housing, and a shroud enclosing the upper portion of the rotatable saw, comprising:

a base having an upper flat surface upon which work is adapted to be supported, a pair of metal guide rails having flat upper surfaces and supported from said base and extending upwardly from said base flat surface with said rail flat surfaces in parallelism therewith, said rails being spaced apart a predetermined distance and providing facing edges which are in parallelism, a rigid metal support plate, carrying (adapted to carry) said housing and shroud in position to project from an upper surface thereof, said support plate having a lower flat surface, portions of which overlie and engage against said rail flat surfaces, said support plate also having a slotted opening (a slot adapted) to pass the saw blade so that a lower portion of the latter (thereof) projects below said support plate, four guide members secured to said support plate to project from the lower surface thereof, said guide members being spaced from each other and arranged in a square pattern, opposite sides of said square pattern being selectively alignable with the facing edges of said guide rails, said support plate slot being disposed between and parallel to two opposite sides of said square pattern, the distance between any adjoining pair of guide members being substantially equal to the spacing between the edge surfaces of said guide rails, and pairs of said guide members at one and (or) the other of opposite sides of said square pattern being selectively engageable with respective edge surfaces of said guide rails to selectively position said support plate and the power saw carried thereby in any one of two positions, which positions are at right angle to each other, whereby said saw may be engaged with said work for crosscutting and ripping operations, said support plate and the saw carried thereby being moved from one position to the other by lifting said support plate from said rails to clear the pair of guide members engaged with the edge surfaces of said guide rails and turning said support plate ninety degrees in planar fashion, and then lowering said support plate onto said rails with the other pair of guide members engaged with the side edges of said rails.

2. The construction according to claim 1 and further including clamp means for holding said support plate against material upward movement with respect to said guide rails.

3. The construction according to claim 2 wherein said clamp means include four clamp members, each being disposed at a side of said square pattern, and each having a portion underlying a guide rail and a portion overlying the upper surface of an adjoining part of said support plate.

4. The construction according to claim 3 wherein each clamp member is formed of sheet metal to U-shape, to provide an upper and lower leg joined by a bight portion, the latter being disposed outside of adjoining edges of said support plate and a guide rail, said upper leg overlying said support plate and the lower leg underlying a guide rail.

5. The construction according to claim 4 wherein said support plate has threaded studs affixed thereto and extending upwardly therefrom, one stud for each clamp member, and wherein said upper leg of each clamp member has a slot through which one of said studs projects, and a nut threaded on said stud to clamp said upper leg to said support plate.

6. The construction according to claim 1 wherein the slot in said support plate has laterally widened sections adjoining the place where said saw engages said work to provide visibility for following the saw cut.

7. The construction according to claim 1 wherein said support plate is provided with brackets at those opposite sides of said square pattern that are transverse to said slot, said brackets providing means for pivotally mounting said saw motor housing and shroud so that said saw may be swung to various angular positions.

8. The construction according to claim 7 wherein one of said brackets also provides means for pivotally mounting a forward portion of said shroud so that the latter may be swung thereabout to move the saw toward and away from the work.

9. The construction according to claim 7, and further including means for holding said saw motor housing and shroud in a selected pivoted position.

10. The construction according to claim 1 wherein a pair of work positioners are carried by said base, one outwardly of each guide rail, each positioner including a vertically disposed plane portion which is adjustable to various angular relations with respect to the line of said guide rails, said plane portion providing a guide for the work.

* * * * *